United States Patent Office 3,110,706
Patented Nov. 12, 1963

3,110,706
PRODUCTION OF POLYMERS BY ANIONIC POLYMERIZATION IN SOLUTION
Bruno Vollmert, Ludwigshafen (Rhine), and Werner Hesser, Hochdorf, Pfalz, Germany, assignors to Badische Anilin- & Soda-Fabrik Aktiengesellschaft, Ludwigshafen (Rhine), Germany
No Drawing. Filed June 23, 1960, Ser. No. 38,106
Claims priority, application Germany June 25, 1959
1 Claim. (Cl. 260—93.5)

This invention relates to a process for the production of copolymers by anionic polymerization in solution.

It is already known that certain unsaturated compounds can be polymerized to form valuable plastics using alkali metals or organo-alkali metal compounds as initiators. Some of the polymers thus prepared by anionic polymerization are superior to polymers obtained by radical polymerization, for example with peroxides or azo compounds as polymerization initiators in many fields of application. A disadvantage of these polymers on the other hand is that the residues of the initiator which are left in the polymer cause undesirable discoloration or cloudiness and can be removed only with difficulty from the polymers. The anionic polymerization can be discontinued by adding substances which react with alkali metals forming salt-like compounds or alkali hydroxides, as for example by adding water, alcohols or aliphatic acids. In this case, for example when sodium is used as an initiator, sodium hydroxide, sodium alcoholates or sodium salts of carboxylic acids are obtained and these substances, if not removed, make the polymers more or less cloudy.

The initiator residues or their reaction products can be removed by pricipitating the polymer from the polymer solution, for example by pouring it into methanol, and repeating this measure until the polymer is clearly transparent, or by extracting the finely ground polymer with solvents for an extended period of time.

All these measures for the purification of anionic polymers are tedious and difficult to carry out on a commercial scale.

We have now found and this is the object of our invention that polymers can be advantageously prepared from unsaturated compounds which are polymerizable anionically, using alkali metals or organo-alkali metal compounds as polymerization initiators, by stopping the polymerization by adding aromatic or hydroaromatic carboxylic acids.

Examples of unsaturated compounds which can be polymerized with alkali metals or their organic compounds as polymerization initiators are styrene, homologues of styrene such as ortho- and para-methylstyrene, dimethylstyrene, aminostyrenes, alpha-methylstyrene, vinylnaphthalene, methacrylic acid esters, as for example methyl methacrylate, isoprene, butadiene, dimethylbutadiene or mixtures of these monomers with each other. In addition to normal copolymers in which the monomer radicals of the different comonomers are distributed statistically over the polymer chain, so-called block copolymers in which long chain sections of a polymer —(A—A—A—A)$_n$— alternate with those of a polymer —(B—B—B—B)$_n$— can also be prepared by anionic polymerization.

In the practice of the anionic polymerization it is advantageous to allow the monomer to be polymerized to flow into the solution of the initiator in a solvent which is inert under the reaction conditions, preferably in tetrahydrofurane or mixtures of tetrahydrofurane with other solvents, while excluding oxygen and water as completely as possible. The temperature can be varied within wide limits ranging from about —80° to +100° C., preferably from —20° to +60° C. To carry away the heat of polymerization, use may be made of low boiling point solvents, as for example ethylene, ethane, propane, butane, pentane, dimethyl ether or tetrahydrofurane, the particular type of solvent used depending on the polymerization temperature. The polymerization then proceeds at the boiling temperature of the solvent used or only slightly above the same and the heat of polymerization is used up to vaporize the solvent so that the polymerization temperature remains constant.

Suitable initiators for the anionic polymerization are the alkali metals, such as lithium, sodium or potassium, preferably in the form of dispersions in inert organic solvents. Naphthalene sodium, which is obtainable by the action of sodium on solutions of naphthalene in ethers, such as dimethyl ether, glycol dimethyl ether or tetrahydrofurane, or phenyl lithium conpounds, or alkyl lithium compounds, such as methyl lithium, ethyl lithium or butyl lithium, phenyl sodium, triphenyl methyl potassium, isopropyl sodium, amyl sodium and other organoalkali metal compounds, such as benzyl sodium, benzyl potassium, benzyl lithium, triphenylmethyl potassium, diphenyl sodium or tetra-alpha-methylstyrene sodium, which may be prepared by known methods, can also be used as polymerization initiators, sometimes even with special advantages.

To effect the stoppage of the polymerization, aromatic or hydroaromatic carboxylic acids, which are preferably dissolved in the solvent used in the polymerization, are allowed to flow while stirring into the polymer solution, which mostly has a highly viscous consistency, when the introduction of the monomers has been completed. Before being mixed with the polymer solution, the solution of the carboxylic acids is preferably freed from oxygen, for example by leading pure nitrogen through the solution for a short time.

The polymers obtained are especially pale or even colorless when a small quantity of water is used in addition to the aromatic or hydroaromatic carboxylic acid for stopping the polymerization. The carboxylic acid and the water can be added as a mixture, but the two components can also be incorporated one after another, for example by first allowing the water and then the carboxylic acid to flow into the polymer solution.

The carboxylic acid and the water, if any, are advantageously used in an amount equivalent to that of the alkali metals or organo-alkali metal compounds used as an initiator in the polymerization. Normally, the amount used lies between about 0.01 to 10 percent with reference to the weight of the monomers and polymers in the solution. However, there is no harm in adding the water and the carboxylic acid in a slight excess, for example of 1 to 10 percent with reference to the amount equivalent to the initiator.

Among the aromatic or hydroaromatic carboxylic acids half-esters of phthalic acid and half-esters of derivatives of phthalic acid, such as tetrahydrophthalic acid or endomethylene tetrahydrophthalic acid, are of special interest because the use of such half-esters gives especially pale or even colorless and transparent polymers.

As alcohols forming the alcoholic component of the phthalic acid half-esters those monohydric aliphatic alcohols can be used which contain from 1 to about 20 carbon atoms. These aliphatic alcohols may be linear or branched, saturated or unsaturated. Suitable alcohols of this kind are for example methyl, ethyl, normal propyl, isopropyl, normal butyl, isobutyl, tertiary butyl, amyl, neopentyl, normal hexyl, normal octyl, 2-ethylhexyl, lauryl, cetyl or allyl alcohol.

Araliphatic alcohols can also be used as alcoholic components of the phthalic acid half-esters. Here benzyl alcohol is particularly suitable because the monobenzyl ester of phthalic acid crystallizes very well and therefore may be very easily prepared. Further alcohols of this kind are phenylethyl alcohol and phenylpropyl alcohol.

Finally, phenols which can be esterified with phthalic acid to form half-esters are also suitable, for example phenol or cresols.

It is beneficial to use the said half-esters, like the carboxylic acids previously specified, as pure as possible, as the polymers may otherwise undergo discoloration on being further processed through the impurities introduced with the said adducts.

The polymers can be obtained from the polymer solutions by distilling off the solvent, preferably in vacuo, for example on roller driers or in vacuum extruders.

The polymers may also be precipitated from their solutions by the addition of, for example, methanol and the precipitated polymers then dried.

The following examples will further illustrate this invention but the invention is not restricted to these examples. The parts specified in the examples are parts by weight.

*Example 1*

A mixture of 1750 parts of absolute tetrahydrofurane and 1000 parts of dry styrene is allowed to flow while stirring under a pure nitrogen atmosphere into a solution of 0.84 part of phenyl lithium in 250 parts of absolute tetrahydrofurane at such a rate that the temperature of the solution does not exceed +10° C. The heat formed by the polymerization is carried away by cooling with water or ice-water. When all of the mixture has been added, a highly viscous dark red solution is obtained. To this solution a solution of 0.185 part of water in 50 parts of tetrahydrofurane is added after having been freed from oxygen with nitrogen. The deep red color of the solution changes to pale yellow within a few minutes. In the same way, a solution of 2.78 parts of the monoethylhexyl ester of phthalic acid in 100 parts of tetrahydrofurane is allowed to flow in, whereby the solution of the polymer becomes completely colorless in a short time.

The polystyrene is stripped from the solution by distilling off the tetrahydrofurane in vacuo. Test specimens injection molded from the polystyrene are clearly transparent and almost colorless. The absorption of water is not appreciably higher than in the case of a polystyrene produced by bulk polymerization.

*Example 2*

To 500 parts of pure anhydrous tetrahydrofurane charged into a stirring vessel with a reflux condenser 30 parts of a deep green solution of naphthalene sodium in pure tetrahydrofurane, which contains 0.0766 part of sodium are added and then a mixture of 500 parts of styrene and 1500 parts of absolute tetrahydrofurane is allowed to flow in in the course of 10 minutes, the tetrahydrofurane being set boiling by the polymerization heat set free. To the resultant highly viscous deep-red polymer solution there are then added first a solution of 0.12 part of water and 20 parts of tetrahydrofurane and then a solution of 0.94 part of monobenzyl phthalate in 20 parts of tetrahydrofurane. The polymer solution decolorizes immediately and becomes milky white in the course of 10 minutes. It is evaporated in dishes at 110° C. in vacuo. The polystyrene thus obtained is clearly transparent and completely colorless. The impact strength according to DIN 53,453 is 30 to 35 cm.kg./cm.² and the Vicat number is 99°.

*Example 3*

25 parts of a deep green solution of naphthalene sodium in pure tetrahydrofurane which contains 0.076 part of sodium are fed into a stirring vessel containing 500 parts of pure anhydrous tetrahydrofurane. Then, with the internal temperature being −40° C., a mixture of 375 parts of alpha-methylstyrene and 1000 parts of absolute tetrahydrofurane is allowed to flow in in the course of 20 minutes followed by a mixture of 125 parts of styrene and 500 parts of tetrahydrofurane. To end the polymerization, there are then added 0.12 part of water dissolved in 20 parts of tetrahydrofurane and 0.94 part of monobenzyl phthalate also dissolved in 20 parts of tetrahydrofurane.

The colorless solution is evaporated at 100° to 140° C. in vacuo. A clear colorless block polymer is obtained having a softening point of 140° C.

*Example 4*

Into a stirring vessel, under pure nitrogen, there are introduced consecutively 1000 parts of tetrahydrofurane and 50 parts of a 2 percent solution of triphenylmethyl potassium prepared from triphenylmethyl ethyl ether and potassium. Then a mixture of 750 parts of styrene and 1000 parts of tetrahydrofurane is allowed to flow in in the course of an hour at 20° C., complete polymerization taking place. The polymerization is carried out while excluding moisture and air as completely as possible. The polymerization heat is removed by cooling with ice-water.

When all of the solution of styrene has been supplied, there are consecutively added 10 parts of a 1 percent solution of water in tetrahydrofurane and 25 parts of a 5 percent solution of the phthalic acid monoester of 2-hydroxyethyl benzyl ether in tetrahydrofurane. The polymer solution obtained is evaporated in a vacuum drying cabinet. A glass-clear polystyrene is obtained having a molecular weight of 200,000.

*Example 5*

To 3000 parts of dimethyl ether and 1.5 part of a 30 percent dispersion of sodium in xylene and 100 parts of alpha-methyl-styrene charged into a pressure vessel which can be cooled with solid carbon dioxide in acetone to −70° C. and in fact is cooled to −60° C. in the course of an hour while stirring 50 parts of styrene are added so slowly that the temperature can be kept at −60° C.

Then 0.5 part of water and 10 parts of the phthalic acid monoester of an alcohol ($C_{12}$–$C_{16}$-alcohol from coconut oil) are added. The solution of poly-alpha-methyl-styrene/styrene-segment polymer thus obtained is led through a heated degasification tower, whereby the dimethyl ether escapes and the initially frothy polymer is withdrawn from the tower as a viscous melt with a screw or gear pump.

We claim:

In a process for the production of a polymer by anionic polymerization of monovinyl compounds selected from the group consisting of styrene and alpha-methylstyrene in the presence of an initiator selected from the group consisting of alkali metals and organo-alkali metal compounds in an inert organic solvent, the improvement which comprises stopping the polymerization by the addition of water and a phthalic acid monoester of a monohydric alcohol selected from the group consisting of aliphatic and araliphatic alcohols containing from 1 to 20 carbon atoms in an amount for each of said water and said phthalic acid monoester of about 0.01–10% with reference to the weight of the monomers and polymers in solution and sufficient to stop said polymerization.

References Cited in the file of this patent

UNITED STATES PATENTS 2,920,065  Myerholtz et al. _____ Jan. 5, 1960

FOREIGN PATENTS 888,172  Germany _____ Aug. 31, 1953